Sept. 16, 1930. T. A. BRYSON 1,776,063
AUTOMATIC MACHINE CONTROL
Filed April 16, 1924 6 Sheets-Sheet 2
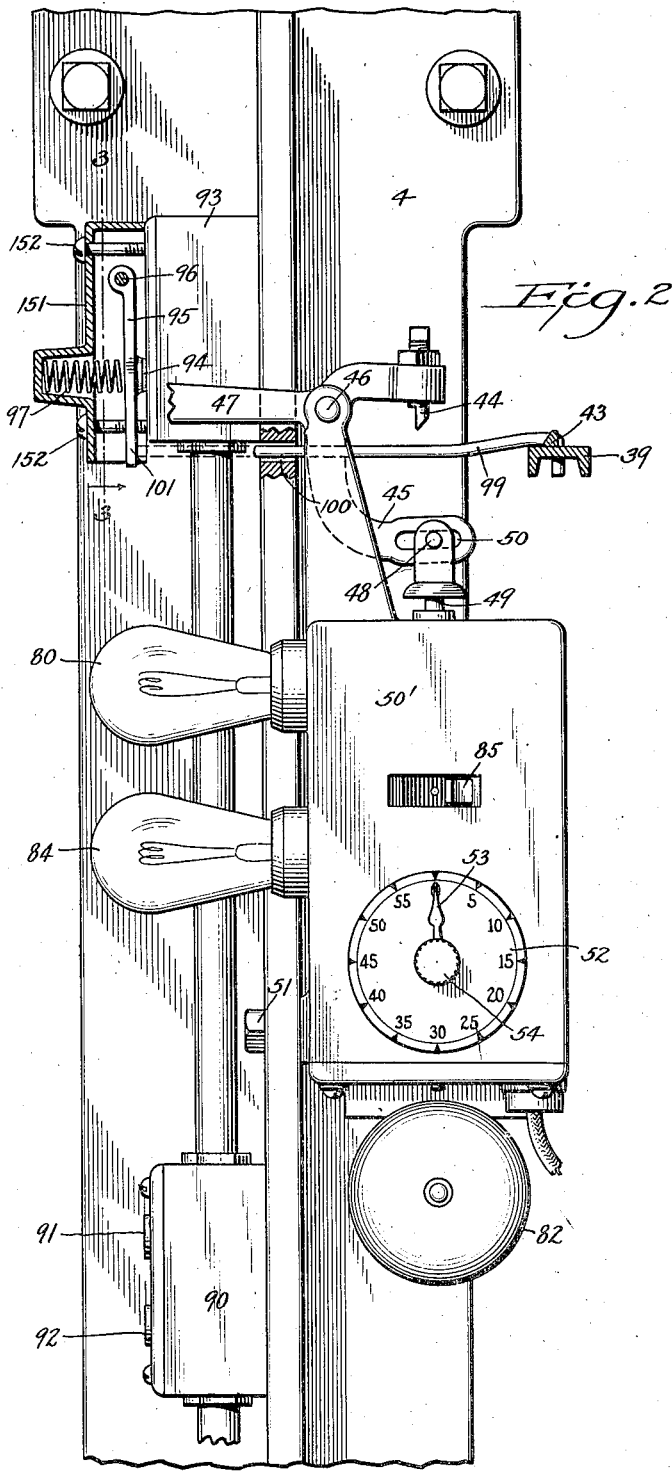
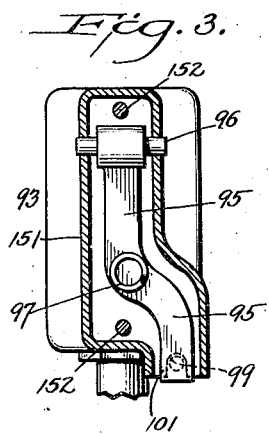
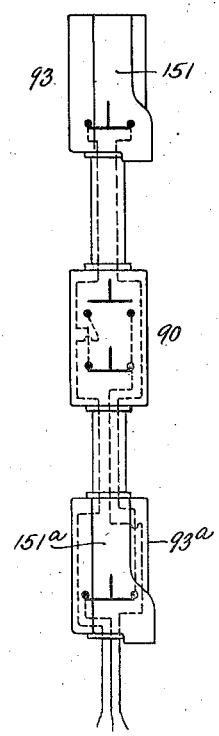
INVENTOR
T. A. Bryson
BY
John D. Morgan
ATTORNEY Sept. 16, 1930.  T. A. BRYSON  1,776,063
AUTOMATIC MACHINE CONTROL
Filed April 16, 1924   6 Sheets-Sheet 3
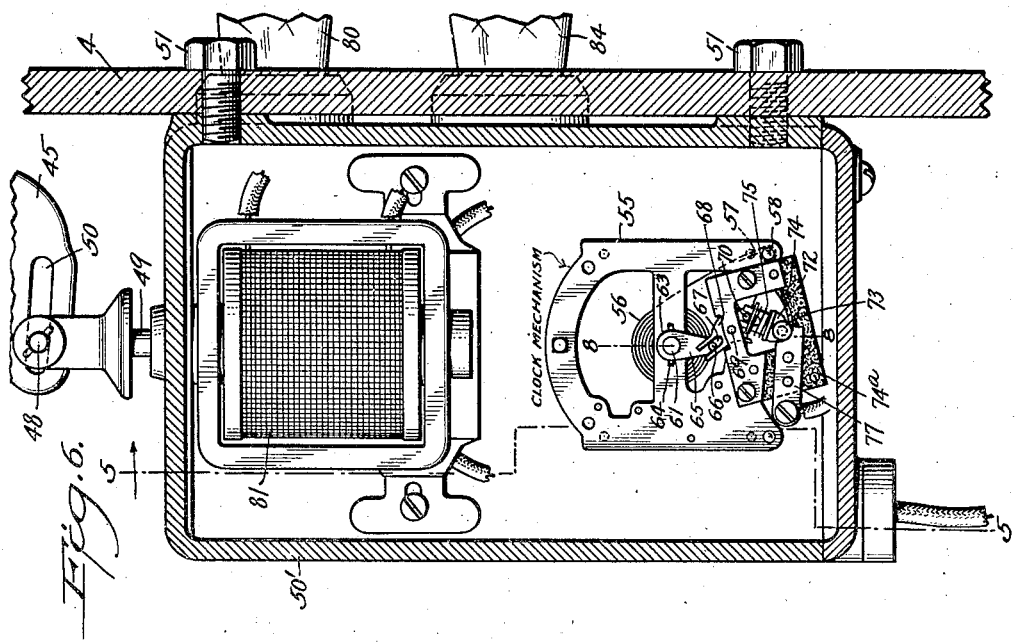
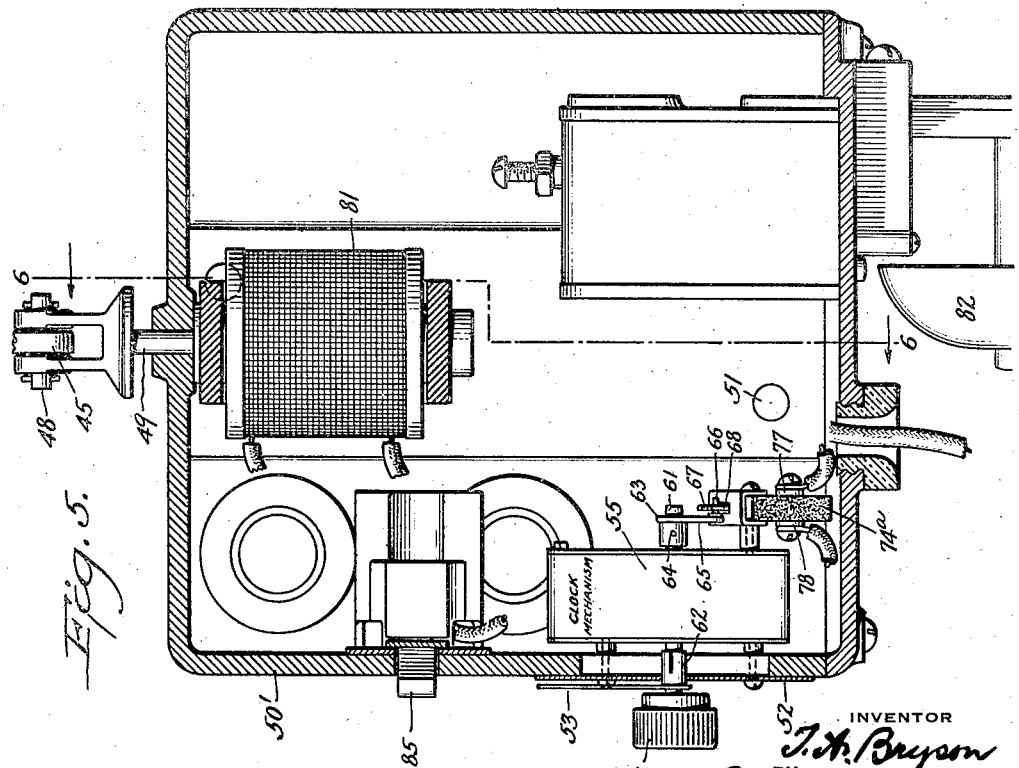

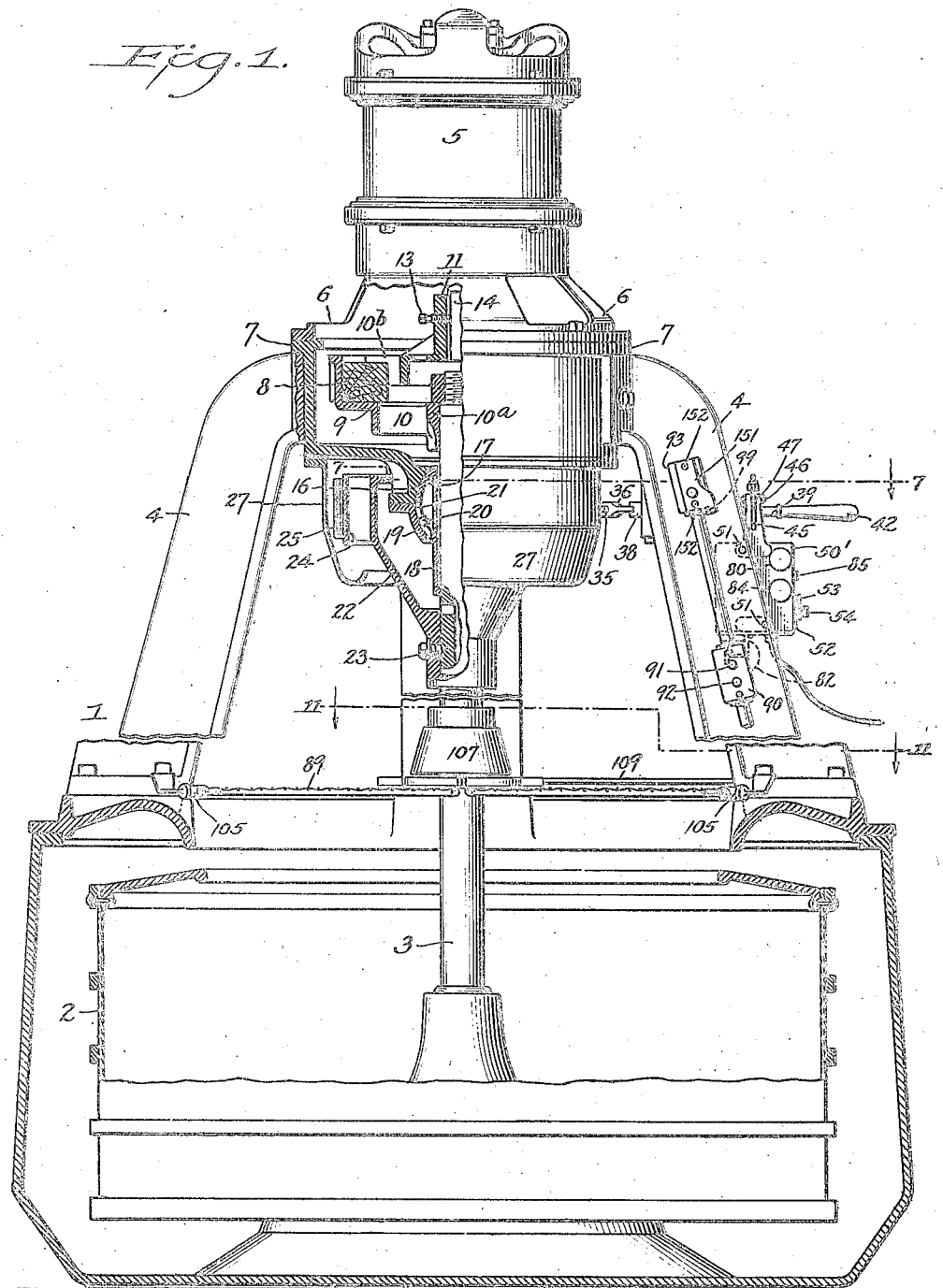

Sept. 16, 1930.                T. A. BRYSON                1,776,063
                         AUTOMATIC MACHINE CONTROL
                          Filed April 16, 1924        6 Sheets-Sheet 4
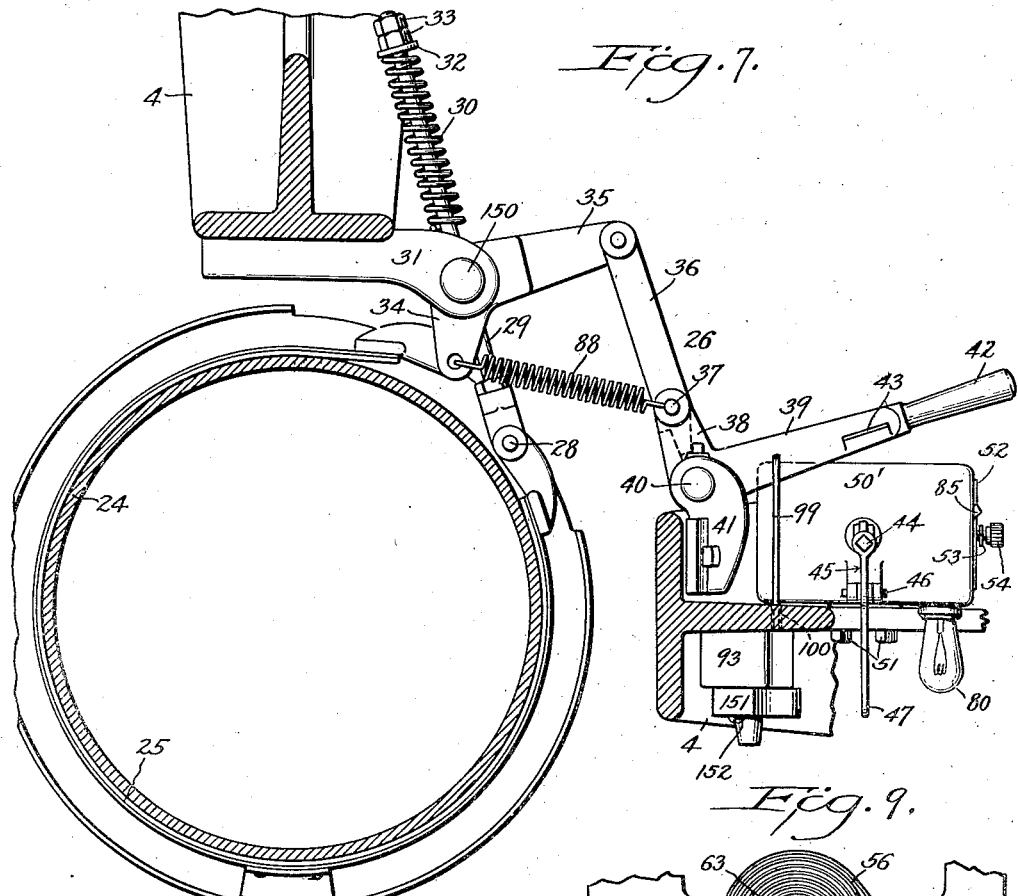
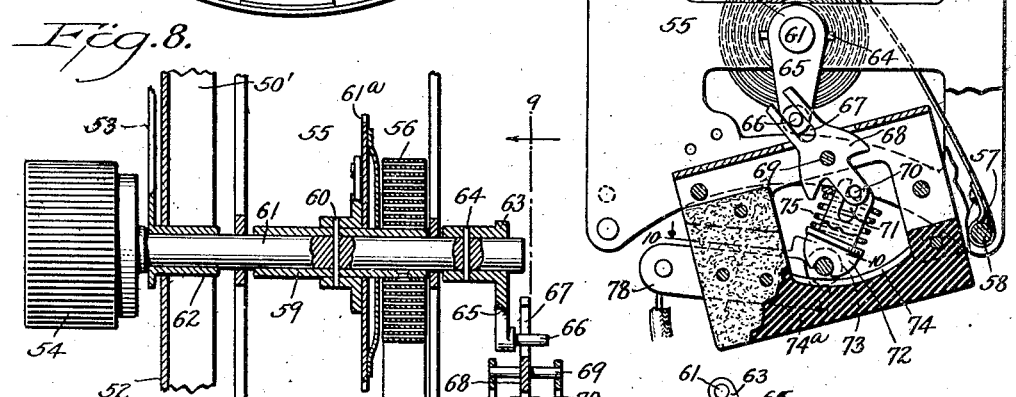
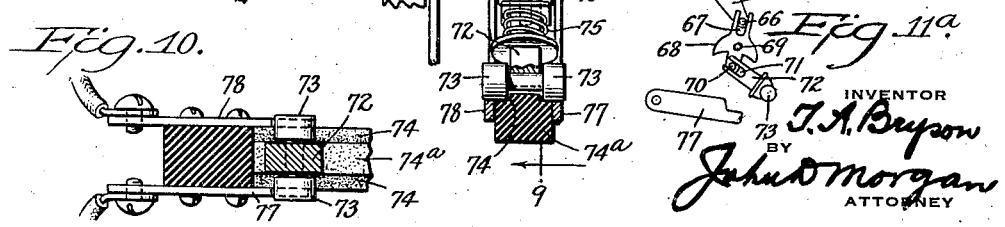

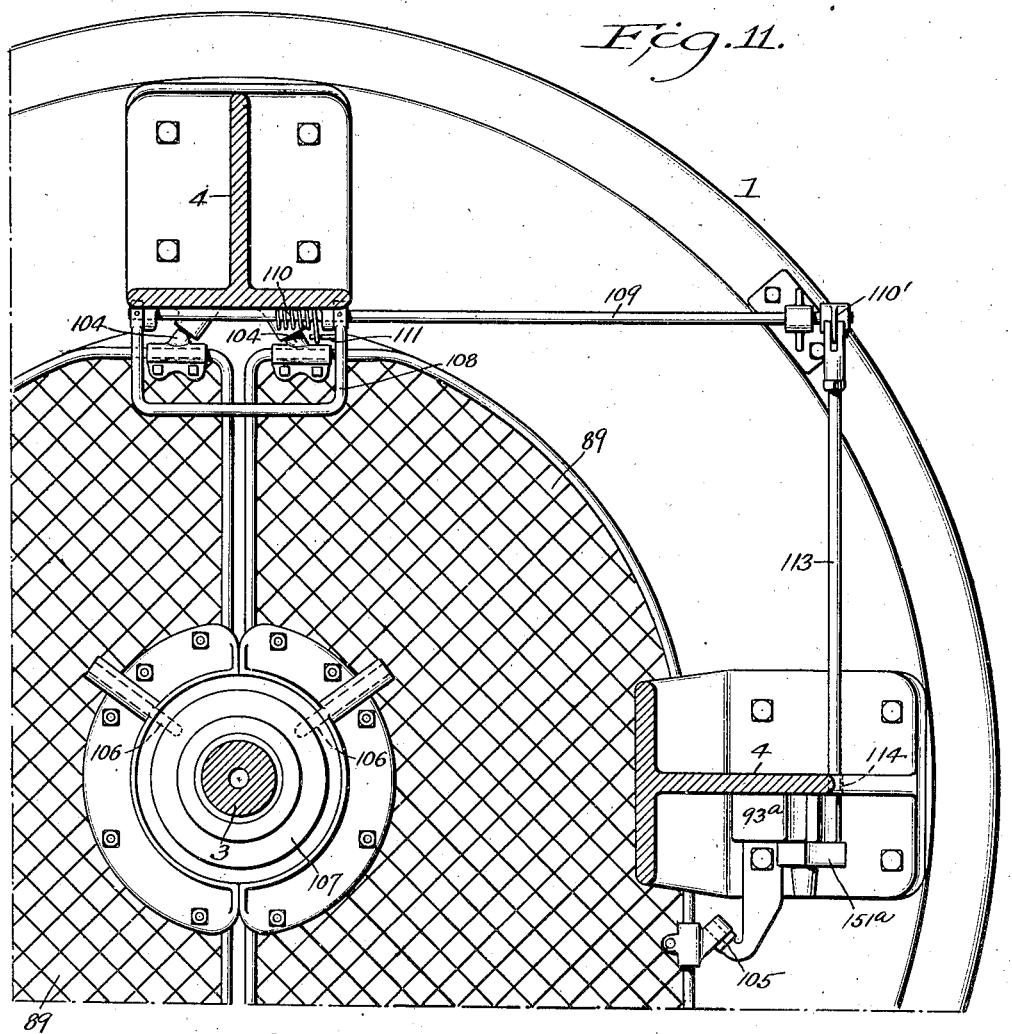
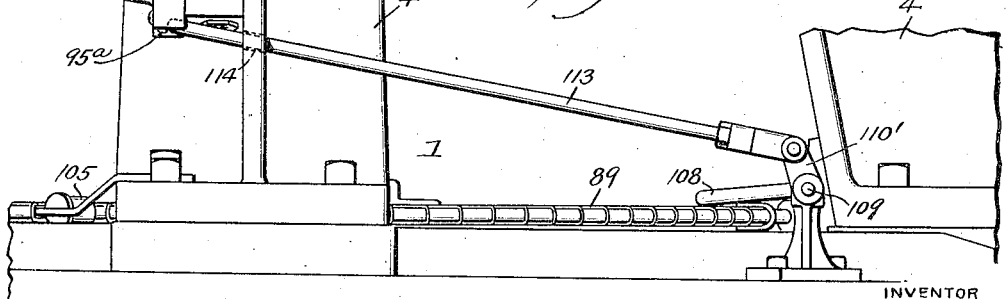

Sept. 16, 1930.   T. A. BRYSON   1,776,063
AUTOMATIC MACHINE CONTROL
Filed April 16, 1924   6 Sheets-Sheet 6
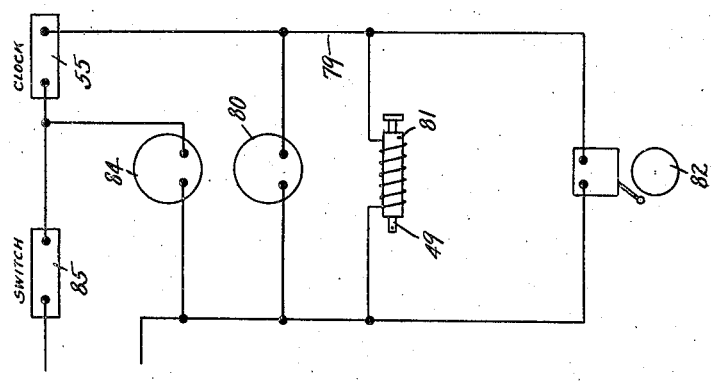
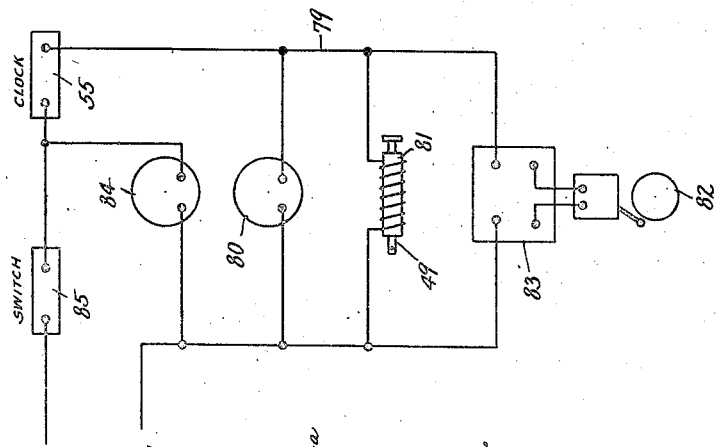
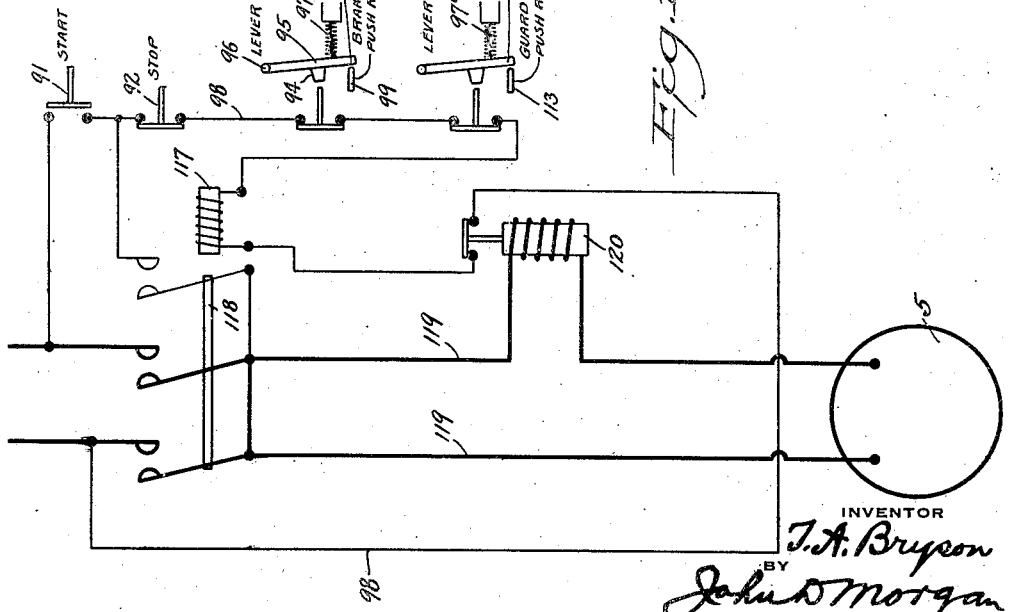
INVENTOR
T. A. Bryson
BY John D. Morgan
ATTORNEY Patented Sept. 16, 1930

1,776,063

UNITED STATES PATENT OFFICE

TANDY A. BRYSON, OF TROY, NEW YORK, ASSIGNOR, BY MESNE ASSIGNMENTS, TO TOLHURST MACHINE WORKS, INC., OF TROY, NEW YORK, A CORPORATION OF NEW YORK

AUTOMATIC MACHINE CONTROL

Application filed April 16, 1924. Serial No. 706,983.

My invention relates to automatic controls, which can be applied to different machines. I have shown it, for purposes of illustration, in connection with a centrifugal drying machine, to which it is particularly adapted.

My invention comprises certain interlocking circuit controls, and also a time measuring mechanism, driven independently of the machine to be controlled, and operating automatically, after the expiration of the particular predetermined interval of time to which it is set by the operator, to shut down the machine and also, preferably, to give an audible or visual signal, or both, as may be desired.

Other objects and advantages of the invention will in part be set forth hereinafter, and in part will be obvious herefrom, the same being attained through the means, instrumentalities, and combinations pointed out in the appended claims.

The invention consists in the novel parts, constructions, arrangements, combinations and improvements herein shown and described.

The accompanying drawings referred to herein, and constituting a part hereof, illustrate one embodiment of the invention, and together with the description serve to explain the principles thereof.

Of the drawings:—

Fig. 1 is a fragmentary vertical section through a centrifugal separator shown equipped with my invention;

Fig. 2 is a side elevation, on an enlarged scale, partly in vertical section, showing my automatic timer;

Fig. 3 is a detail sectional view on the line 3—3 of Fig. 2;

Fig. 4 is a diagram of the holding circuit;

Fig. 5 is a vertical section on an enlarged scale, through the timer on the line 5—5 of Fig. 6;

Fig. 6 is a vertical section substantially on the line 6—6 of Fig. 5;

Fig. 7 is a horizontal section, substantially on the line 7—7 of Fig. 1, looking in the direction of the arrow;

Fig. 8 is a detail vertical section on line 8—8 of Fig. 6;

Fig. 9 is a detail vertical section on the line 9—9 of Fig. 8;

Fig. 10 is a detail sectional view substantially on the line 10—10 of Fig. 9;

Fig. 11$^a$ is a fragmentary view of some of the moving parts of the timer;

Fig. 11 is a fragmentary horizontal section on the line 11—11 of Fig. 1, looking in the direction of the arrows;

Fig. 12 is a detail showing the operation of the closure or guard lock;

Fig. 13 is a diagram of the holding and motor circuits;

Fig. 14 is a diagram of the direct current timer circuit in which no transformer need be used;

Fig. 15 is a diagram of the alternating current timer circuit in which a transformer is employed; either circuit being optional, depending upon the form of current employed.

In operating centrifugals or other machines, as now employed, there is considerable loss of power in running the machines longer than is necessary to accomplish the desired result. In running such machines, particularly centrifugals, the operator knows how long the machine should be operated to get the result desired with the particular material treated. It is customary for him, therefore, to watch an ordinary clock and shut off the power when the time interval has elapsed. Frequently, however, he is inattentive, or has other work to perform, and does not perform his duty quickly so that the centrifugal, or other machine, will run more or less beyond the time necessary to properly treat the material in the basket.

For the attendant to cut off the power at the exact expiration of the desired interval of operation it is usually customary for him, after starting the machine, to watch the clock until the necessary time has elapsed and then stop the machine. This insures that the load does not run longer than necessary but wastes the attendant's time because he does nothing but keep track of the clock while the centrifugal is in operation. In such machines even when the power is shut off manually, after the exact interval of elapsed time, the attendant then has to apply the brake and wait for the machine, or in a centrifugal the basket, to stop, which is a further waste of his time, and adds to the cost of labor and overhead, because the machine is not operated to its maximum capacity, as it can be made to do by my invention.

By my automatic timer, which may be built into the machine or added as an attachment, I employ a time measuring instrument, driven independently of the machine to be controlled, which is set by the operator, and at the expiration of the particular period of time designated for that particular run, the power will be shut off automatically and the brake applied, so that by the time the operator, who may be attending to other duties or other machines, reaches this particular machine, the basket has been stopped and there is no delay in unloading it, reloading and completing the cycle.

In my automatic timer, I also preferably employ a visual signal and also preferably an audible signal, so that the moment of the expiration of the period of time has elapsed the power is cut off, and the brake applied, as previously stated, and in addition both an audible and a visual signal are made so as to immediately attract the attention of the operator. The operator can, therefore, attend to a plurality of such centrifugals, or other machines, or perform other duties around the factory, with the positive assurance that exactly at the expiration of the period of time set for the particular machine, my timer will automatically perform the functions above set forth. These automatic, visual and audible signals continue until the attendant comes to the machine and turns the timer switch.

In addition to these main advantages I also employ with the machine just described certain controls, one of which is mounted in the control circuit and operated by the brake lever, so that it is impossible to turn on the current to start the centrifugal until the brake lever is in its inoperative position. Another control which I preferably employ is also mounted in the control circuit and is operated by the closure or guard for the basket, so that the closure or guard has to be down in its closed position, before it is possible to start the centrifugal through the starting push button in the holding circuit.

I also preferably arrange my automatic timer so that it can, if desired for any purpose, be cut out, and the machine used without its aid, being then controlled by hand. I also preferably use a second visual signal which will show the operator that the timer is in operation or set. This visual signal is preferably an electric lamp of one color, say green, and is energized as soon as the timer circuit is closed. The other visual signal, showing that the automatic timer has operated, after the interval of time set, is an incandescent light of a different color, for example red. This red light is energized only after the expiration of the time limit, and after the brake is automatically thrown on, and it and the bell, continue to be energized until the attendant cuts off the timer circuit.

I have shown my invention embodied in connection with a centrifugal 1 of any suitable construction having a basket 2 supported at the bottom in a suitable stop bearing, a gyratory central spindle 3, and side frames 4, 4. In the form which I preferably employ the gyratory central spindle 3 is driven by an overhead motor 5, mounted rigidly on the frame 6, carried by the top frame part 7 of frame 4, the motor driving the gyratory central spindle 3 direct through a centrifugally acting friction clutch. This particular form is no part of my present invention but I have illustrated it as a centrifugal clutch formed of a plurality of arcuate blocks of wood 8 (only one being shown), resting loosely in a bell or pan-shaped clutch member 9, secured to the central spindle 3 by spokes 10 and a hub 10ᵃ. These blocks of wood 8 are held in position by spider arms 10ᵇ, formed on a hub 11, fixed by the screw 13 to the motor shaft 14. The arrangement is such that when the motor is actuated the spider arms 10ᵇ cause the blocks of wood to rotate, and centrifugal action moves them outward to grip the clutch 9, carried by the spindle 3, the blocks slipping more or less until the spindle 3 reaches the same speed as the motor axle 14.

The top frame part 7 is provided with a socket 16 within which fits the ball 17 carried by the sleeve 18 through which passes the central spindle 3. Secured to the top frame part is a clamp ring 19, so as to securely hold the ball 17 in the position shown in Fig. 1, which will permit the fixed motor 5 to drive the spindle 3, through the friction clutch previously described, even when it has the necessary gyratory motion, permitted by the ball and socket connection. The inclination or swing of the ball within the socket is limited by a lug 20 carried by the clamp ring 19 working within a slot 21 within the ball.

A brake sleeve 22 is secured to the spindle 3 in any suitable manner such as by the brake sleeve screw 23, so that the brake sleeve 22 rotates with, and for all practical purposes is, a part of the central spindle 3. Near the upper end of the brake sleeve I mount a brake drum 24 which is adapted to be engaged by the contracting brake band 25 of the brake 26. Extending partly around the brake band and brake drum 24, I mount a brake guard 27 attaching it to the top frame 7.

With more particular reference to Fig. 7 the brake band 25 is connected at 28 with a rod 29 having a surrounding helical spring 30. One end of the spring 30 bears upon the fixed bracket 31 while its other end bears upon a washer 32 controlled by adjustable nuts 33; this arrangement serving as an adjustable yielding anchorage for this end of the brake band 25. The other end of the brake band 25 is connected to the bell crank lever 34 pivoted on the pivot 150 in the fixed bracket 31. The other end 35 of this lever 34 is connected to a link 36, which is pivoted at 37 to the arm 38 of the bell crank brake lever 39, which itself is pivoted at 40 to the bracket 41 secured on the side brace 4. This bell crank brake lever 39 is provided with a handle 42 and with any suitable form of detent or lug 43 to cooperate with a cooperating latch 44, Fig. 2, carried by the lever 45, Fig. 2, pivoted at 46 on the side brace 4.

Automatic timer

This lever 45 is as shown substantially C-shaped and is provided with a handle 47, so that the lever 45 can be controlled manually, rather than by the automatic timer to which it is connected by a pin 48 carried by the core rod 49 of the solenoid 81, the pin working in the slot 50 in the end of the lever 45 opposite the latch 44.

My automatic timer may be built into the machine, but preferably it is made as an attachment as shown in the drawings.

The automatic timer as illustrated includes a housing 50' secured to the side brace 4 in any suitable manner such as by the bolts 51, 51, Fig. 6. Mounted in or on this housing 50' is a dial 52, a pointer 53, an operating knob 54 and a clock-work or time measuring device 55, comprising a spiral spring 56, having one end 57, Fig. 9, connected to the pin 58, and the other end to the sleeve 59 keyed by the key 60 to the axle 61 upon which the knob 54 is immovably mounted, Fig. 8. On this axle 61 is also immovably mounted a sleeve 62 carrying the pointer 53. On the other end of the axle 61 is mounted a sleeve 63 by means of the key 64, this sleeve carrying an arm 65 having a pin 66 which engages in the slot 67, Fig. 8, of the lever 68 which is pivoted on the pin 69, the other end of the lever 68 having a pin 70, Figs. 9 and 11ª, cooperating with a slot 71 in the rocking member 72. This member 72 is provided on its other end with a pair of rollers 73, 73 working in the arcuate insulating tracks 74, 74, and are held on the tracks by the insulated support 74ª, Figs. 8, 9, 10 and 11ª. Means are provided for effecting the quick closing of the electric circuits which effect the stopping of the machine when the set or predetermined time has elapsed. As embodied, a spring 75 is coiled about member 72, in compression between the members 68 and 72. This spring 75 is placed under greater compression as the clock work unwinds, due to the motion of shaft 61, and moves gradually from the position of Fig. 11ª toward the dead center. It passes the dead center just at the expiration of the predetermined time, and spring 75 snaps the member 72 to the position of Fig. 9, thus instantaneously closing the circuit for stopping the machine.

I have shown my dial 52, Fig. 2, divided into sixty equal parts, each part designating a minute. When the automatic timer is thrown into circuit, in a manner to be more fully hereinafter described, the knob 54 with the pointer 53 is moved around until the pointer designates the particular interval of time the material in the basket 2 is to be treated. Assuming, for example, that the interval of time is say, ten minutes, the knob 54 is moved around until the pointer 53 comes opposite to the numeral 10 on the dial 52, Fig. 2. In moving the pointer in this manner the spring 56, Figs. 8 and 9, is wound up and the lever 68 and member 72 are moved from the position shown in Figs. 9 and 10, to that shown in Fig. 11ª, wherein the rolling electrical switch members 73, 73 operated by the member 72 and moving upon the arcuate insulating tracks 74, 74 is moved from the contact plates 77 and 78, Figs. 8 and 9, so that the current passing through the timer circuit 79, Figs. 14 or 15, is broken.

The spring 56, which corresponds to the driving spring of any clock mechanism, is set by the attendant as already described, This starts the clock mechanism running and its movement is controlled by any known or suitable form of escapement, which may be connected to the toothed wheel 61ª, which is fixed to turn with spring 56 by the pin 60. Thus the clock mechanism will run for the predetermined time to which it has been set by turning knob 54, as already described.

As the clockwork runs under control of its escapement, the hand 53 gradually travels backwardly, counter-clockwise on the dial, and driving spring 56 unwinds under the control of the escapement, and arm 65 moves in the clockwise direction in Fig. 9. It reaches the dead center at the end of the set or predetermined time, and is snapped to the circuit-closing position of Fig. 9 by spring 75, as already described. It will be noted that in this movement, the springs 56 and 75 work together.

When the mechanism is thus snapped to circuit-closing position, the rolling electrical contact members 73, 73 move on the arcuate insulating tracks 74, 74, to the left from the position shown in Fig. 11ª, and make contact with the fixed contact plates 77 and 78, Figs. 8, 9 and 10, which will automatically close whichever timer circuit 79 is employed, Figs. 14 and 15. The instant that this timer circuit 79 is closed by the rolling electrical contact members 73, 73, the red light 80, Figs. 14 or 15, the solenoid 81, and the bell 82 are energized. It has previously been stated that the timer circuits 79, 79 are identical except one has a transformer 83, which is not necessary in the other direct current circuit.

It will be seen in the diagrams, Figs. 14 and 15, of the timer circuit that I preferably employ another visual signal 84 being the second lamp and of a different color, usually green, while the lamp 80 is red. This green light is so connected that it is lighted the moment that the timer switch 85 is thrown on and gives visible notice to the operator that the automatic timer is in electrical connection; whereas the red light 80 is only energized at the expiration of the particular interval of time at which the timer has been set. This red light 80 indicates to the attendant that the motor 5 has been cut off and the brake 25 applied. This timer circuit 79 is usually connected to the ordinary electric light circuit of the factory, though it may be connected in any other suitable manner as found convenient or expedient.

At the same time that the clock mechanism causes the rolling contacts 73, 73 to make connections between the fixed contact plates 77 and 78, Figs. 8, 9 and 10, at the expiration of the time limit, and thereby energize the red light 80 and ring the bell 82, it will also, as previously noted, energize the solenoid 81, which, in turn, will rock the lever 45 on its pivot 46 and release the latch 44 from engagement with the detent or lug 43 upon the brake lever 39. The moment that this is done the springs 88, 88, only one of them being shown in Fig. 7, will then be released and instantly contract the brake band 25 onto the brake drum 24 and stop the rotation of the spindle 3 and the basket 2.

Electrical control mechanism

The mechanism so far described will control the application of power to the rotation of the basket 2 for a certain predetermined period of time, but in addition to this feature of my invention I preferably employ certain controls, so that it is impossible to energize the motor 5 until the brake is in its released or inoperative position; and also, preferably, until the guard or closure 89 for the basket is in its closed position to prevent injury to a careless or inattentive operator.

Attached to the centrifugal, and preferably to the same side brace 4; I mount a push button station 90, Figs. 1 and 2, having a starting button 91 and a stop button 92. Mounted above this push button station 90 is an auxiliary stop station 93, having a single stop button 94 which is normally pressed inwardly by the lever or finger 95, hinged at 96 and pressed by the coil spring 97, so that this spring 97, acting through the finger or lever 95, will normally press the stop button 94 and thereby normally break the holding circuit 98, Fig. 13. This lever or finger 95 is mounted in the housing 151 secured to the stop station 93 by screws 152, 152, Figs. 2 and 3.

Attached to the brake lever 39 is a push rod 99, Figs. 2 and 7, operating through an opening 100 in the side brace 4 and bearing on the end 101 of the pivoted finger 95; the parts being so arranged that when the brake lever 39 is latched by the detent lug 43 of the lever being in engagement with the latch 44 of the timing device, the end of the push rod 99 will press the end 101 of the pivoted finger or lever 95 away from the stop button 94 against the action of the coil spring 97 and will permit the button 94 to close the holding circuit 98, Fig. 13, at that point.

It has been previously pointed out that when the solenoid 81 is energized by the timing circuit 79, Figs. 14 and 15, the rod 49 will be raised which will rock the lever 45, Fig. 2, and with it the latch 44 which will free the detent 43 carried by the brake lever 39. The springs 88, 88 will instantly apply the band brake 25 to the brake drum 24. This very movement of the brake lever 39 will withdraw the push rod 99 from the finger or lever 95, Fig. 2, release the spring 97 which will instantly operate the stop button 94 through the lever 95 and break the holding circuit 98 thereby cutting out the motor 5.

I also preferably, though not necessarily, employ another control in the holding circuit 98, which operates substantially as the one just described, except that it is controlled by the movement of the sections of the basket closure 89, Figs. 11 and 12. These two sections of the closure 89 are each pivoted at 104, 104 and 105, 105, on the centrifugal casing so that they can swing up and clear the basket 2 that it may be readily loaded and unloaded. To hold these two members of the closure 89 in their operative position, I may employ spring pressed latches 106 which take under the cone shaped member 107, but can be readily lifted so as to release the closure when the basket has been stopped.

Resting on the top of these sections of the closure 89 is a lever, Fig. 11, formed by a bent rod 108 fixed to the rod 109, a coil spring 110 having one end bearing upon one of the side braces, the other end of the spring bearing upon a pin 111 secured to the lever 108, so as normally to press the lever down and in contact with the sections of the closure 89. The other end of the rod 109 has an arm 110′ fast on it to which is connected a guard push rod 113 passing through and guided in an opening 114 in one of the side braces 4, the very end of the push guard rod 113 bearing upon a pivoted lever or finger 95ª, mounted in a housing 151ª and operating a stop push button mounted in an auxiliary stop button station 93ª, Fig. 12, preferably identical in all respects with the auxiliary stop station 93, housing 151, stop button 94 and pivoted finger 95 of Figs. 2 and 3. This guard push rod 113 is mounted in the holding circuit 98 shown more clearly in the diagram of Fig. 13.

It will be seen from this diagram of the wiring that when the guard 89 is in the position shown in Figs. 11 and 12, it will compress the spiral spring 97ª by the guard push rod 113 pressing against the end of the pivoted lever 95ª, this will permit the stop button to close the holding circuit 98 at this point. With the brake push rod 99 also compressing the spring 97 the holding circuit is closed at that point, the parts now being in the position to start the motor 5, which can be done by pressing the push button 91. This push button then closes the entire holding circuit 98, the stop push button 92 being closed.

The moment that the holding circuit 98 is closed the solenoid 117 is energized and causes the electric switch 118 to complete the motor circuit 119, thereby energizing the motor 5. In the diagram in Fig. 13 an overload relay 120 is shown.

Various modifications of my invention may be made in which the automatic timer may control only a warning light or bell; or may shut off the motive power, and not apply the brake; or my invention may be applied to a belt driven machine to release a spring or weight control belt shifter to cut off the power. This is true because my invention, in one of its broadest aspects, is a time measuring instrument, driven independently of the machine to be controlled, and adapted to either give an automatic visual or audible signal, or cut off the motor power without giving a signal, or, in some cases, cut off the motive power without applying the brake.

*Operation*

It is believed that the operation of my invention will be perfectly clear from the description previously given. The operation may be summarized briefly as follows, relying upon the main description for the details:

The switch 85 is in the open circuit position, and the basket is loaded. The brake is latched in the "off" position and the safety guard is closed. With the brake in the "off" position, the brake push rod 99 has been moved to the left, from the position shown in Fig. 2, and engaged with the end 101 of the pivoted finger or lever 95, and thereby released the stop button 94 from the action of the spring 97, so that the control circuit was closed at that point, Fig. 13.

The timer is set by the operator moving the pointer 53 over the dial 52 to the desired number of minutes that the machine is to run, say for example, ten minutes. By this movement, the timer circuit 79 is broken by the rolling contacts 73, 73 being moved along their arcuate tracks 74, 74 away from the fixed contact plates 77, 78, Fig. 9.

Switch 85 is now moved to circuit closing position and the green light 84 is thereby turned on as an indication that the timer is in use. The start button 91 is pressed, thus energizing solenoid 117 to close the motor circuit and start the machine.

The moment that the predetermined interval of time has elapsed, for example, in this case ten minutes, the spring 56 will have caused the rolling electrical contact members 73, 73 to move along their arcuate tracks 74, 74 from the position shown in Fig. 11ª to that shown in Figs. 8, 9 and 10. The moment that the rolling contact members 73, 73 are snapped into engagement with the fixed electrical plates 77, 78 the timing circuit 79 will be closed, the red light 80 energized, the bell 82 rung and the solenoid 81 energized. The instant that the solenoid 81 is energized the rod 49 is actuated to rock the lever 45 and move the latch 44 from engagement with the detent lug 43 carried by the brake lever 39. The moment that the brake lever is released the springs 88, 88 will cause the band brake 25 to firmly clamp the brake drum 24. At the same time that the brake goes on, the brake push rod 99, which is attached to the brake lever 39 is pulled to the right from the position shown in Fig. 2, releasing the pivoted finger or lever 95, permitting the coil spring 97 to instantly actuate the lever 95 to press the stop button 94. This will break the holding circuit 98 at that point and cut off the power from the motor by breaking the motor circuit 119.

The red light 80 and the bell 82 will continue to be energized until the attendant or operator opens the switch 85 which cuts out the timing circuit 79 and also the green light 84. Assuming that there is no guard control in the holding circuit 98, Fig. 13, the basket 2 can now be unloaded and reloaded and the cycle repeated.

For greater safety and to prevent injury to careless or inattentive operators, I have shown the holding circuit 98 with another control operated by the positioning of the guard or closure 89. When the centrifugal is equipped with such a guard and control mechanism, the control circuit 98 is not closed, and, therefore, the motor cannot be operated by the push button 91, until the different sections of the guard or closure 89 are brought into their closed position shown in Figs. 1, 11 and 12. In the closed position of the guard or closure 89 the guard push button rod 113 will bear against the end of the pivoted finger or lever 95ª mounted in the housing 151ª attached to the stop button station 93ª, these parts being similar in operation and structure in all particulars to the corresponding parts 93, 95 and 151 shown in detail in Figs. 2 and 3. When equipped with this double control the centrifugal, before the starting button 91 can be operated to start the motor, must have the brake in its inoperative position, and the closure or guard 89 in its closed position.

In some cases, as previously pointed out, it may be desirable, for any particular operation, to run the centrifugal with the automatic timer disconnected. This can be done by throwing the switch 85 into the open position, and manually controlling the release of the detent lug 43 and latch 44 by rocking the lever 45 by the handle 47.

The invention in its broader aspects is not limited to the specific mechanisms shown and described but departures may be made therefrom within the scope of the accompanying claims without departing from the principles of the invention and without sacrificing its chief advantages.

What I claim is:—

1. The combination of a machine, a motor to drive said machine, a motor circuit, a switch in said motor circuit, a holding circuit, means including a time measuring device and adapted after the expiration of a predetermined interval of time to automatically actuate the switch in the motor circuit to stop the motor, a brake, a control in the holding circuit actuated by the position of the brake, the brake being automatically thrown on and the control operated to cut off the motor circuit at the expiration of the predetermined interval of time.

2. The combination of a machine, a motor to drive said machine, a motor circuit, a switch in said motor circuit, a holding circuit, means including a time measuring device and adapted after the expiration of a predetermined interval of time to automatically actuate the switch in the motor circuit to stop the motor, a brake, a guard, a control in the holding circuit actuated by the position of the brake, another control in the holding circuit actuated by the positioning of the guard, the brake being automatically thrown on and one of the controls operated to cut off the motor circuit at the expiration of the predetermined interval of time.

3. The combination of a centrifugal, a motor to drive it, a motor circuit having a switch, a holding circuit, means including a time measuring device adapted to break said holding circuit after the expiration of the predetermined set time to automatically control the motor circuit and cut off the current from the motor, and a control located in the holding circuit and operated by a movable part of the centrifugal.

4. The combination of a centrifugal having a basket, a motor to drive it, a motor circuit having a switch, a holding circuit, a control adapted to normally open the holding circuit, a brake, a member actuated by the brake adapted to move the control into its inoperative position, a time measuring means adapted at the expiration of the predetermined set interval of time to release the brake and operate the control in the holding circuit so that the brake and the switch of the motor circuit will be operated automatically to stop the basket of the centrifugal and the motor.

5. The combination of a centrifugal having a basket, a motor to drive it, a motor circuit having a switch, a holding circuit, a control adapted to normally open the holding circuit, a brake, a member actuated by the brake adapted to move the control into its open circuit position, a time measuring means adapted at the expiration of the predetermined set interval of time to release the brake and operate the control in the holding circuit, so that the brake and the switch of the motor circuit will be operated automatically to stop the basket of the centrifugal and the motor, and signal means controlled by the time measuring means which are automatically energized at the expiration of the time limit.

6. The combination of a centrifugal having a basket, a motor to drive it, a motor circuit having a switch, a holding circuit, two controls adapted to normally open the holding circuit, a brake, a member actuated by the brake adapted to move one of the controls into its open circuit position, a guard for the centrifugal basket, a member actuated by the guard and adapted to operate the other control in the holding circuit, time measuring means adapted at the expiration of the predetermined set interval of time to release the brake and the control in the holding circuit so that the brake and the switch of the motor circuit will be operated automatically to stop the basket of the centrifugal and the motor.

7. The combination of a centrifugal having a basket, a motor to drive it, a motor circuit having a switch, a holding circuit, two controls adapted to normally open the holding circuit, a brake, a member actuated by the brake adapted to move one of the controls into its open circuit position, a guard for the centrifugal basket, a member actuated by the guard and adapted to operate the other control in the holding circuit, time measuring means adapted at the expiration of the predetermined set interval of time to release the brake and the control in the holding circuit, so that the brake and the switch of the motor circuit will be operated automatically to stop the basket of the centrifugal and the motor, and signal means controlled by the time measuring means which are automatically energized at the expiration of the time limit.

8. A new article of manufacture comprising a timer attachment for machines, including a casing, adapted to be secured to a machine, time measuring means located within the casing, a dial, a pointer, means to energize the time measuring means when the pointer is set for any particular interval of time, fixed electrical contacts mounted in the casing, a movable electrical contact actuated by the time measuring means, the fixed and movable electrical contacts being brought back into engagement and closing the circuit at the expiration of the predetermined interval of time at which the timer has been set and a solenoid adapted to be energized when the fixed and movable contacts are in engagement, said solenoid being adapted to cooperate with the driving mechanism of the machine for controlling said mechanism.

9. A new article of manufacture comprising a timer attachment for machines, including a casing, adapted to be secured to a machine, time measuring means located within the casing, a dial, a pointer, means to energize the time measuring means when the pointer is set for any particular interval of time, fixed electrical contacts mounted in the casing, a movable electrical contact actuated by the time measuring means, the fixed and movable electrical contacts being brought back into engagement and closing the circuit at the expiration of the predetermined interval of time at which the timer has been set, and a signal adapted to be energized when the fixed and movable electrical contacts are brought into engagement for indicating that the machine has stopped.

10. A new article of manufacture comprising a timer attachment for machines, including a casing, adapted to be secured to a machine, time measuring means located within the casing, a dial, a pointer, means to energize the time measuring means when the pointer is set for any particular interval of time, fixed electrical contacts mounted in the casing, a movable electrical contact actuated by the time measuring means, the fixed and movable electrical contacts being brought back into engagement and closing the circuit at the expiration of the predetermined interval of time at which the timer has been set, and an electrical signal and a solenoid adapted to be energized when the fixed and movable contacts are in engagement, said solenoid being adapted to cooperate with the driving mechanism of the machine for stopping the machine.

11. A new article of manufacture comprising a timer attachment for machines including a casing adapted to be secured to a machine, an electric circuit, a switch, a visual signal which is energized when the switch is turned on to indicate that the timer attachment is in operation, time measuring means located within the casing, a dial, a pointer, means to energize the time measuring means when the pointer is set for any particular interval of time, a solenoid, a second visual signal, an audible signal, fixed electric contacts, a movable electrical contact actuated by the time measuring means, the fixed and movable electrical contacts being brought back into engagement and closing the circuit at the expiration of the predetermined interval of time, and automatically energizing the second visual signal, the audible signal and the solenoid.

12. A centrifugal machine including in combination, a basket, means for rotating the basket including a motor, a safety closure, an automatically applied brake, a switch in the motor circuit, a holding circuit for the motor circuit switch, two switches in series in the holding circuit, one of said switches being normally closed and held open by the opening of the safety closure and the other switch being normally open and held closed by the retracted brake.

13. A centrifugal machine including in combination a basket, means for rotating the basket including a motor, a safety closure, an automatically applied brake, a switch in the motor circuit, a holding circuit for the motor circuit switch, two switches in series in the holding circuit, one of said switches being normally closed and held open by the opening of the safety closure and the other switch being normally open and held closed by the retracted brake and manually operable start and stop buttons in the holding circuit.

14. The combination of a centrifugal, a motor to drive it, a motor circuit having a switch, a holding circuit, means including a clockwork-operated time measuring device adapted to maintain the holding circuit closed when the time device is set and to break said holding circuit after the expiration of the predetermined set time to automatically control the motor circuit and cut off the current from the motor, control means located in the holding circuit and operated by a movable part of the centrifugal.

15. The combination of a rotatable member, means for rotating the member including in combination a motor, a safety guard for the rotatable member, an automatically applied brake, a switch in the motor circuit, a holding circuit for the motor circuit switch, two switches in series on the holding circuit, one of said switches being normally closed and held open by the opening of the safety guard, and the other switch being normally open and held closed by the retracted brake.

In testimony whereof, I have signed my name to this specification.

TANDY A. BRYSON.